Patented May 13, 1941

2,242,196

UNITED STATES PATENT OFFICE 2,242,196

TELEGRAPH SYSTEM

Alfred Edward Thompson and Reginald Dennis Salmon, Croydon, England, assignors to Creed and Company Limited, Croydon, England Application May 6, 1939, Serial No. 272,116
In Great Britain May 17, 1938

8 Claims. (Cl. 178—69)

This invention relates to printing telegraph systems for operation in circumstances in which interference may be present as, for example, over radio links and has for its object to ensure that received signals are correctly printed.

It is well known that telegraph transmission over radio links suffers from interference due to atmospherics and like disturbances and also due to fading of the signals. Many proposals have been made to minimise the interference with the transmission by converting the effect of fading into the same effect as is produced by atmospherics or vice versa, so that only one kind of disturbance is present at the receiving station, precautions being then taken in an attempt to ensure that the signal is correctly received. Thus, for example, each signal is transmitted a plurality of times, usually three, and the greatest common measure of the received signal impulses translated into the printing of a character. Errors are thus minimised but not eliminated entirely, and, moreover, it is not known with certainty at the transmitting station whether the signals have or have not been correctly received.

It has also been proposed to repeat the transmission of a signal only if it can be assumed that the signal has not been correctly received. Devices were used at each of two stations to indicate when any disturbance (atmospherics or fading) occurred. If a signal were received without such indication being also received printing took place and a signal was sent back to the transmitting station. If this last signal was received without the indication of any disturbance also being received, the next signal was transmitted.

In other words this amounts to the automatic presumption of correct receipt of a signal if no indication be received to the contrary.

According to the present invention printing does not take place until the receiving station receives a signal that the reception took place correctly and the latter signal is only sent from the transmitting station when this latter station knows that the previously sent signal has been correctly received.

According to one feature of the present invention a printing telegraph system comprises means at a first station for transmitting a signal combination, means at a second station for receiving said signal combination and for re-transmitting it to the first station as received, means at the first station for automatically comparing the last mentioned signal combination as received with the first mentioned signal combination as transmitted and for transmitting a printing or non-printing signal according to whether the two are the same or different and for re-transmitting the first mentioned signal combination if the two are different, and means at the second station for printing a character corresponding to the signal combination only upon receipt of a printing signal.

In the application of the invention to a radio printing telegraph system any desired means for radio transmission of the marking and spacing telegraph signals may be used, such as interruption of a continuous carrier wave, the use of an interrupted voice frequency modulated on the carrier wave, a carrier wave modulated by two different voice frequencies for marking and spacing or two different carrier waves for marking and spacing. Preferably any well known arrangement is used to convert one of the kinds of disturbances to which radio signals are subject viz. atmospherics and fading into the other kind, and the printing signal is arranged to consist of a plurality of elements of the same kind as is represented by a disturbance. Thus, for example, if interrupted continuous wave signalling is used, it is clear that emission of carrier represents a marking signal and absence of carrier, a spacing signal or vice versa. If the effect of fading is converted into that of atmospherics then the printing signal consists of an emission of carrier current whether this be regarded as marking or spacing. If the effect of atmospherics is converted into that of fading, on the other hand, the printing signal consists of the absence of carrier current. In an arrangement using two different frequencies for marking and spacing, the relays responding to the two frequencies do not, in the absence of disturbance, both respond at the same time. It has been proposed in such case to record a simultaneous response of both relays or the simultaneous absence of response of both relays as a signal of a particular kind. If such an arrangement be used the printing signal is preferably a signal of this kind, so that the printing signal cannot be converted into a non-printing signal by disturbance.

The nature of the invention will be better understood from the following detailed description taken in conjunction with the accompanying drawings in which.

Figure 1A:
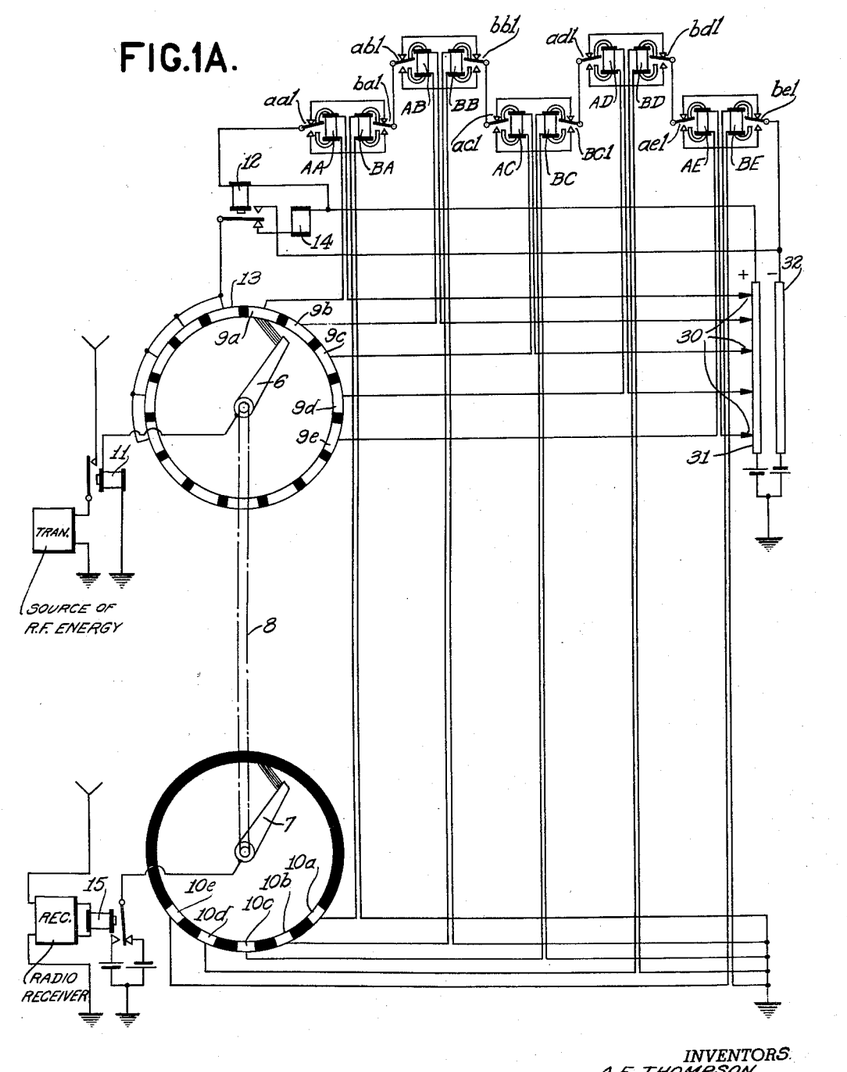
Figs. 1A and 1B show diagrammatically arrangements of a radio telegraph system according to the invention, Fig. 1A showing a transmitting station and Fig. 1B showing a receiving station.

Referring now to Fig. 1A there is provided at the station shown on the left of the drawings, a distributor comprising two brush arms 6, 7 mounted on a spindle 8 driven by a motor at a constant speed, one brush cooperating with one set of fixed contacts, and the other brush with another set of fixed contacts. The brush arm 6 is connected to the winding of a relay 11 adapted to control the output of a transmitting aerial. The contacts 9a to 9e with which brush arm 6 co-operates are connected via polarised relays AA . . . AE to the contacts 30 of a 5-unit transmitter preferably under the control of perforated tape. This transmitter is only shown schematically and may be of any well-known type, such as is used in multiplex telegraph systems in which contacts 30 are connected to positive or negative bus-bars 31 or 32 according to the polarity of the impulses constituting a signal. The brush 7 is connected to the tongue of a relay 15 under the control of signals received from a receiving aerial. The contacts 10a to 10e with which brush arm 7 co-operates are connected to polarised relays BA . . . BE. The corresponding fixed contacts of contacts aa1 and ba1 of relays AA and BA are connected together. The moving contact of contacts ba1 is connected to the moving contact of contacts ab1; the fixed contacts of contacts ab1 are connected to the corresponding contacts of contacts bb1; the moving contact of contact bb1 is connected to the moving contact of contacts ac1, and so on, the arrangement being such as to provide a series of two-way switches so that if any pair of switches are in positions corresponding to opposite polarised signals the circuit throughout the switches will be open. The circuit closed by these switches includes a non-polarised relay 12. The moving contact of this relay is connected to fixed contacts 13 co-operating with brush 6. The fixed contacts of this relay are connected to positive and negative battery, the connection to the positive battery including the stepping magnet 14 of the multiplex transmitter.

Figure 1B:
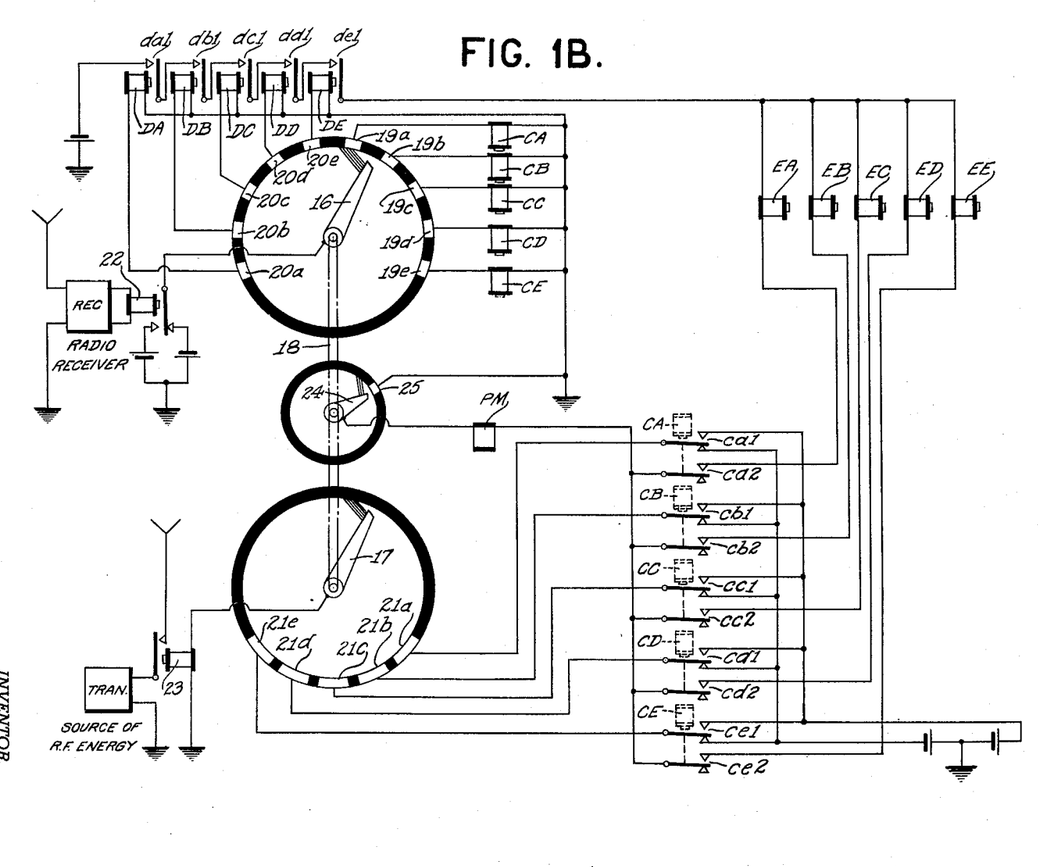

The arrangements at the second station are shown in Fig. 1B, wherein there are provided two brushes 16, 17 mounted on a spindle 18 driven by a motor that is maintained in synchronism and in phase with spindle 8 under the control of the received signals in any well-known manner. Brush 16 co-operates with fixed contacts 19a to 19e and with fixed contacts 20a to 20e. Brush 17 co-operates with another ring of fixed contacts 21a to 21e. Brush 16 is connected to the moving contacts of a receiving relay 22, the fixed contacts of which are connected to opposite poles of a battery having a centre point earth. The contacts 19a to 19e are connected via relays CA . . . CE to earth and the contacts 20 to 20e are connected via relays DA . . . DE also to earth. Brush 17 is connected to earth over a transmitting relay 23 and the fixed contacts 21a to 21e are connected to one or other pole of a battery via the contacts ca1 . . . ce1 of relays CA . . . CE.

A third brush 24 is mounted upon shaft 18 and co-operates with fixed contact 25 connected to earth, the brush 24 being connected to relays EA . . . EE over contacts ca2 . . . ce2 respectively of relays CA . . . CE, the circuit of the relays EA . . . EE being completed to battery and earth over a chain circuit formed by contacts da1 . . . de1 of relays DA . . . DE when these contacts are all operated.

The operation of the arrangement is as follows:

The transmitter contacts (Fig. 1A) are set in accordance with the holes in the perforated tape and impress corresponding polarities on fixed contacts 9a to 9e. The brush 6 as it passes over each contact 9a to 9e operates relays AA . . . AE and at the same time operates relay 11 in the common circuit, the operation of relay 11 effecting the transmission of signals to the aerial circuit. These signals are received by relay 22 (Fig. 1B) which controls the polarity of brush 16 and consequently as brush 16 passes over fixed contacts 19a to 19e polarised relays CA . . . CE are set in accordance with the setting of the transmitter contacts. The setting of relays CA . . . CE determines the setting of contacts ca1 . . . ce1 and consequently the polarity impressed upon fixed contacts 21a to 21e. Brush 17 passes over these fixed contacts immediately brush 16 has passed 19e, and thereby operates relay 23 which transmits signals corresponding to the setting of contacts ca1 . . . ce1. These signals are received by relay 15 (Fig. 1A) which controls the polarity impressed upon brush 7 which is passing over contacts 10a to 10e whilst brush 17 is passing over contacts 21a to 21e. Polarised relays BA . . . BE are consequently set in accordance with the polarity of the signals received upon contacts 10a to 10e.

It will now be seen that if relays AA and BA have been operated by signals of the same polarity the contacts aa1 and ba1 associated with these two relays will lie in the same direction, and consequently the moving contact of relay AA will be connected to the moving contact of relay BA, similarly for the other corresponding relays AB and BB to AE and BE. If, however, the setting of any pair of relays is not in agreement the common circuit established over their contacts will be broken and consequently relay 12 will only be operated if the settings of all the relays agree and will not be operated if there is disagreement in the setting of any one of the pairs of relays. If relay 12 is operated it will impress positive battery on segments 13. Therefore, when brush 6 passes over segments 13 a positive signal will be transmitted and also magnet 14 will operate to set forward the transmitter. Whilst brush 6 (Fig. 1B) is passing over segments 13 brush 16 is passing over segments 20a to 20e and consequently relays DA . . . DE will operate in one direction if segments 13 are connected to positive battery, and will be operated in the other direction if any of the segments 13 are connected to negative battery. If relays DA . . . DE are all operated to marking position the circuit of all the magnets EA . . . EE of a multiplex printer, previously prepared by closure of contacts ca2 . . . ce2 of relays CA . . . CE will be closed. The multiplex printer may be the Murray multiplex printer described on page 394 et seq. of the book by H. H. Harrison entitled "Printing Telegraph Systems and Mechanisms." The printing magnet PM will, however, not be operated unless all the relays DA . . . DE have been operated.

From the above it will be seen that unless the letter received at the transmitting station from the receiving station agrees with the letter transmitted the printing signal will not be transmitted.

If the printing signal is not transmitted the same letter will be retransmitted from the transmitting station and such retransmission of the same letter from the transmitting station will be repeated until it is correctly received back from the receiving station when the printing signal will be transmitted from the transmitting station and the stepping magnet on the transmitter will set forward the transmitter to send the next letter. Furthermore, it will be seen that the printing signal is of such a character that atmospherics cannot mutilate it, since it is an all-marking signal; therefore, if the printing signal is sent it must be received. If a non-printing signal is sent it will be subject to interference, but it will also be seen that unless the interference is such as to cause each one of the relays DA . . . DE to be operated to marking position the printing magnet will not operate. In order that this may happen it would be necessary for a disturbing impulse to be prolonged for at least 100 milli-seconds and furthermore such a disturbing impulse would have to follow a previous interference which had already mutilated a signal. According to common experience, such an interference would be extremely rare. Even should such a non-printing signal be received (as a printing signal) the only danger will be to print an additional letter which in the case of plain text would be readily noticed and in the case of code would at the most involve a repetition of one word. The danger of such an incident passing unnoticed can be guarded against by transmitting at the end of each message or each group of messages the total number of letters that should have been received.

It should be noted that the system can be operated as a duplex system, so that although two channels of communication are used, they may be utilised for transmission of messages in both directions simultaneously. Thus, whilst brush 6 is traversing contacts 9a . . . 9e for transmission of an impulse combination from the left hand station to the right hand station and this combination is being received at the right hand station by the passage of brush 16 over segments 19a . . . 19e, an impulse combination may be in process of transmission from the right hand station by the passage of brush 17 over five segments connected to contacts controlled by a multiplex transmitter. The receiving segments of the distributor and the relays shown at the right hand station would then be duplicated at the left hand station for receipt of an impulse combination, its retransmission, receipt of a printing signal and consequent printing. The relays and the segments of the distributor shown at the left hand station for transmitting an impulse combination, receiving back an impulse combination, comparing the latter with the impulse combination previously transmitted, and for transmitting a printing signal or a repetition of the originally transmitted signal would be duplicated at the right hand station.

Figure 2A:
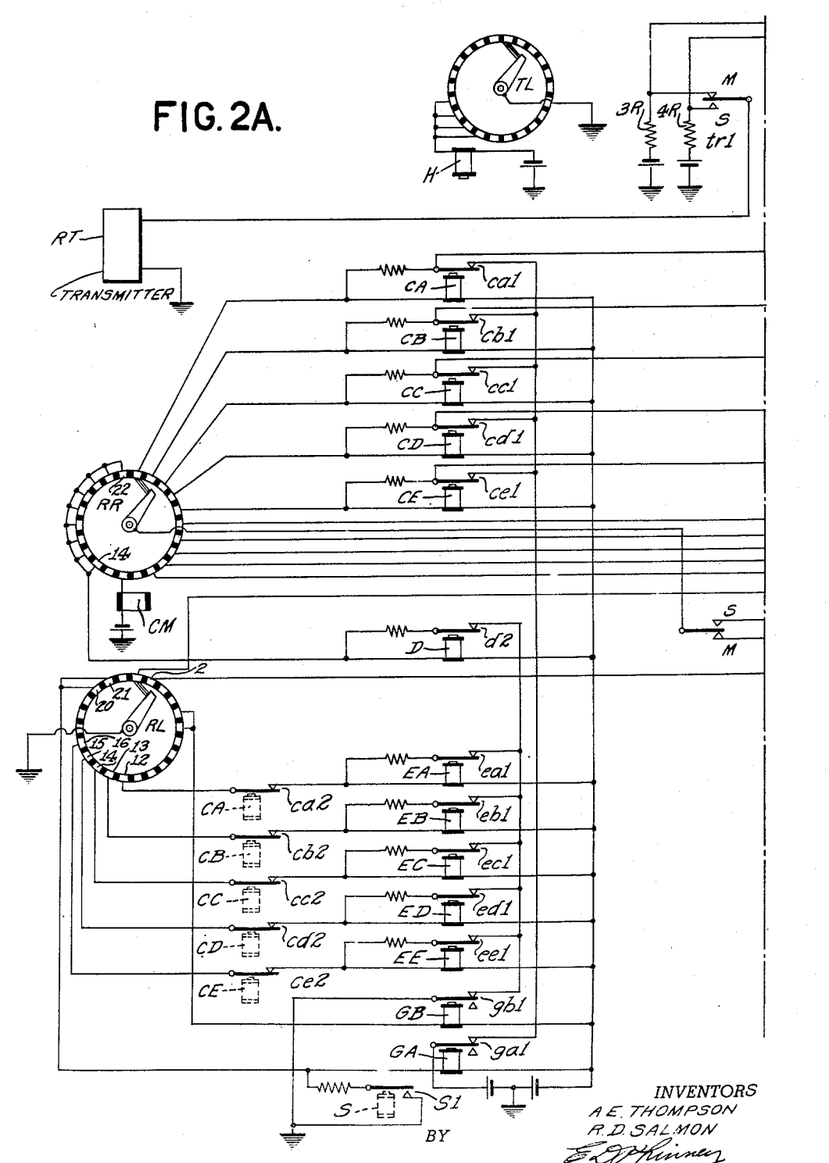
Figs. 2A and 2B which should be joined along the line 22′ show the arrangements at a single station of two intercommunicating stations in which various simplifications and economics have been effected over an arrangement as shown in Figs. 1A and 1B.
Figure 2B:
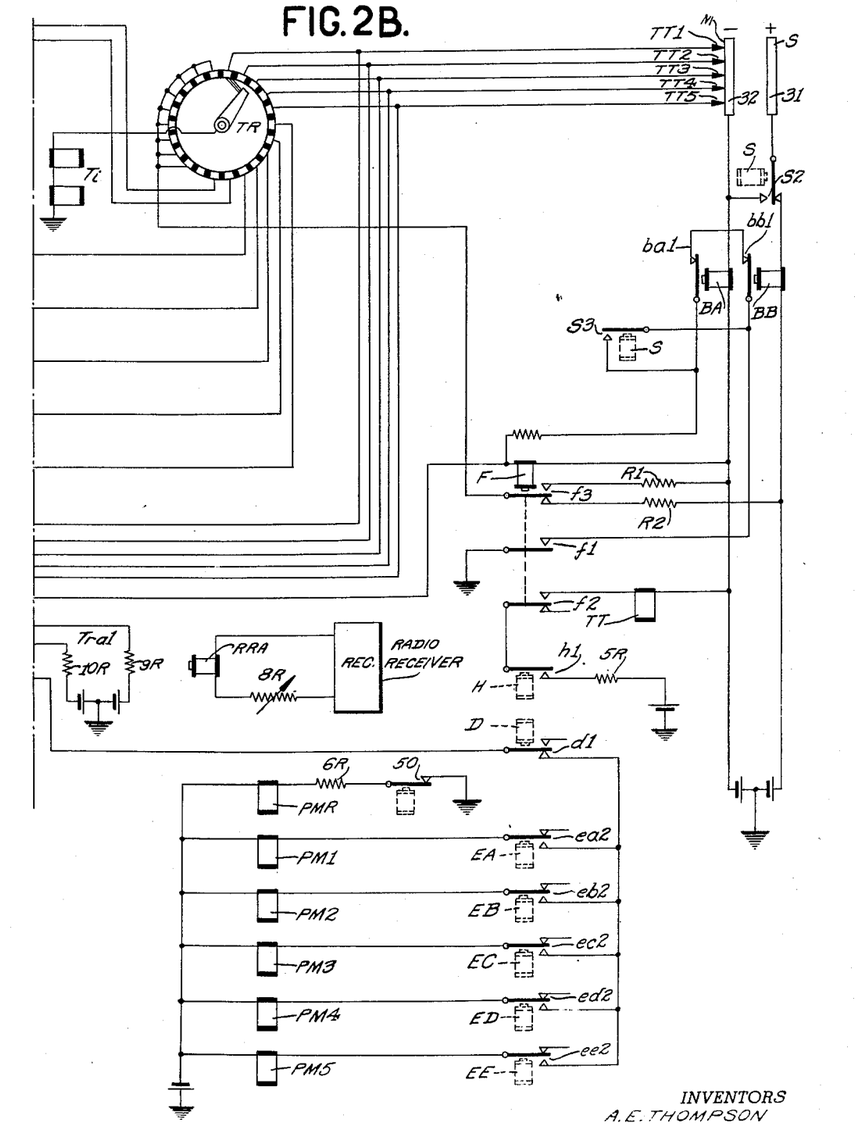

Referring now to Figs. 2A and 2B, the arrangement used comprises four distributor rings shown diagrammatically at TR, TL, RR and RL each shown as a brush rotating over a ring of segments. Each of these rings is of the well-known type in which a rotating brush connects a segmented ring with a continuous ring, the continuous rings being connected to the circuits to which the respective brushes are shown in the drawings as connected. The distributor rings TR and TL are allocated to transmission and the rings RR and RL to reception. The brushes of all the rings are driven together, and any well known means may be used for keeping the brushes at the two stations in synchronism. One method will be described hereinafter. It will be readily understood by those skilled in the art, however, that the brushes wiping over rings RR and RL are adjusted to be later in phase than the brushes wiping over rings TR and TL to an extent dependent upon the propagation time of the signals between the two stations.

Let the two intercommunicating stations be called X and Y and assume station X is transmitting a message to station Y. The signal combinations to be transmitted, according to the well-known five unit code are determined by a transmitter controlled by a perforated tape. This transmitter is of the well-known kind in which peckers controlled by perforations in the tape determine the connection of contact points TT1 . . . TT5 to marking or spacing bus bars 32 or 31 respectively, which bus bars are connected to negative and positive battery respectively. The contact points TT1 . . . TT5 are connected to segments 1 . . . 5 of distributor ring TR and as the brush rotates over these segments positive and negative potential is connected by the brush to a transmitting relay TR. Contacts tr1 of relay TR connect negative or positive potential over resistances 3R and 4R respectively to modulate a radio transmitter RT in well-known manner and cause the transmission of signals to station Y.

At station Y the signals are received in a radio receiver RR, demodulated, and the resultant telegraph signals applied over resistance 8R to polarised receiving relay RRA. Contacts rra1 connect negative or positive potential over resistances 10R and 9R, according as they are in marking or spacing position, and over segments 1 . . . 5 of distributor ring RR to relays CA . . . CE and to negative battery. Those relays to which marking potential is applied from contacts rra1 do not energise, those relays to which spacing potential is applied, energise and close contacts ca1 . . . ce1, and ca2 . . . ce2.

Contacts ca1 . . . ce1 close locking circuits for the relays that have been operated. Contacts ca2 . . . ce2 connect relays EA . . . EE to segments 12 . . . 16 of distributor ring RL.

If any of the contacts ca1 . . . ce1 are unoperated, negative battery (marking potential) is connected over the corresponding relay CA . . . CE to the corresponding segment of the segments 6 . . . 10 of the transmitting ring TR at station Y, whilst if the contacts ca1 . . . ce1 are operated, positive (spacing) potential is connected over contacts ga1 in normal position and the operated contacts ca1 and ce1 to the segment of ring TR. Station Y will thus transmit back to station X the signals as received.

At station X the receiving brushes are passing over segments 6 . . . 10 as the signals are received. The segments 6 . . . 10 of ring RR are connected to the contacts TT1 . . . TT5 of the tape controlled transmitter. If the signal sent by contact TT1 was a marking signal, a marking signal should be received from contacts rra1 over segment 6 of ring RR. Two relays BA and BB are provided, BA being connected between negative battery and bus bar 32 and relay BB between positive battery and bus bar 31. Thus if a marking signal be received and contacts rra1 are in marking position when the brush passes over segment 6 of ring RR both sides of relay BA are at marking potential and the circuit of BB is open and no current flows. If a spacing signal had originally been transmitted by the tape controlled transmitter so that contacts TT1 are connected to spacing bus bar 31, and a spacing signal is received so that contacts rra1 apply spacing potential over segment 6 of ring RR then this potential is applied over TT1 to bus bar 31. Both sides of relay BB are at spacing potential and the circuit of relay BA is open.

It will be seen therefore that if the received combination is the same as the transmitted combination neither relay BA nor BB energises. Should, however, any one of the elements of the combination received be different from the corresponding element as transmitted either relay BA or BB is energised and contacts ba1 or bb1 are opened.

Relay F is normally energised and closes a locking circuit for itself over contacts ba1, bb1 and front contacts f1. At contacts f3 it connects segments 14 to 22 of distributor ring TR to marking potential. Thus if relay BA or relay BB is not energised, a signal consisting of nine marking elements is transmitted. This signal constitutes a printing signal. Relay H is energised over segments 13 to 16 of distributor ring TL, and at contacts h1 a circuit is completed from positive battery, resistance 5R, front contacts f2, stepping magnet TT of the tape controlled transmitter, negative battery. The tape of the transmitter is stepped forward and controls contacts TT1 ... TT5 for the next combination.

If on the other hand, either relay BA or BB is energised, the locking circuit of relay F is broken at contacts ba1 or bb1, and at contacts f3 spacing potential is connected to segments 14 to 22 of ring TR so that a non-printing signal is transmitted. The circuit of the stepping magnet TT cannot be completed, being open at contacts f2 and consequently, during the next rotation over the distributor ring TR the same combination is again transmitted over segments 1 ... 5.

At station Y the printing or the non-printing signal is received whilst the brush of the receiving ring RR is passing over segments 14 to 22. If a printing signal be received, contacts rra1 are at this time in marking position and negative potential is connected over these segments to one side of relay D, the other side of which is also connected to negative potential. Consequently relay D does not energise.

As the brush of distributor ring RL passes over segments 12 to 16 relays EA ... EE are connected in operating circuits over contacts ca2 ... ce2 of the relays CA ... CE that had previously operated. Thus the combination of the relays CA ... CE that had been operated is transferred to the relays EA ... EE and those of the latter relays that operate close locking circuits for themselves over contacts ea1 ... ee1 and contacts gb1 to earth. The relays CA ... CE that were previously operated and had closed locking circuits for themselves are unlocked when the brush of ring RL passes over segments 20 and 21. When this happens relay GA is energised and at contacts ga1 opens the locking circuits for the relays CA ... CE. Contacts ea2 ... ee2 prepare circuits for the magnets PM1 ... PM5 of a multiple magnet printer. If relay D does not operate, i. e. if a printing signal is received, the circuit for these magnets is completed over segment 2 of ring RL, and the signal combination duly operates the printer. This printer is of the kind previously described in connection with Figs. 1A and 1B but modified so that contact 50 is closed by the operation of any of the bars controlled by the magnets PM1 ... PM5. If any of these is operated and contact 50 closed, the printer magnet PMR is operated over resistance 6R.

If on the other hand a non-print signal is received, relay D will be energised over segments 14 to 22 of the distributor ring RR and then closes a locking circuit for itself over contacts d2. Contacts d1 open the printer magnet circuit and no printing can take place.

Synchronisation of the distributors is shown as being achieved by means of the well-known system described with reference to Fig. 313 on p. 312 of the book by H. H. Harrison entitled "Printing Telegraph Systems and Mechanisms," the correcting magnet CM being shown connected to segment 12 of distributor ring RR. From segments 11 and 12 of the distributor ring TR two impulses of opposite character are sent. If the impulse sent out over segment 11 arrives at the other station over segment 12, the correcting magnet CM is operated to set back the phase of the receiving distributor. It will be noted that this impulse is of the opposite character to that of the printing impulses and this ensures that disturbance will not insert a false correcting impulse.

Switches S1, S2 and S3 are provided in order to permit of definite conditions being applied to all the segments of the distributors to ensure rapid initial synchronisation. Switch S1 when operated short circuits relay GA and so prevents locking of the relays CA ... CE and ensures that marking potential is applied to segments 6 to 10 of ring TR. Switch S2 short circuits the bus bars 31 and 32 and maintains segments 1 to 5 at marking potential. Switch S3 ensures that relay F remains operated and thus applies marking potential to segments 14 to 22.

Figure 3:
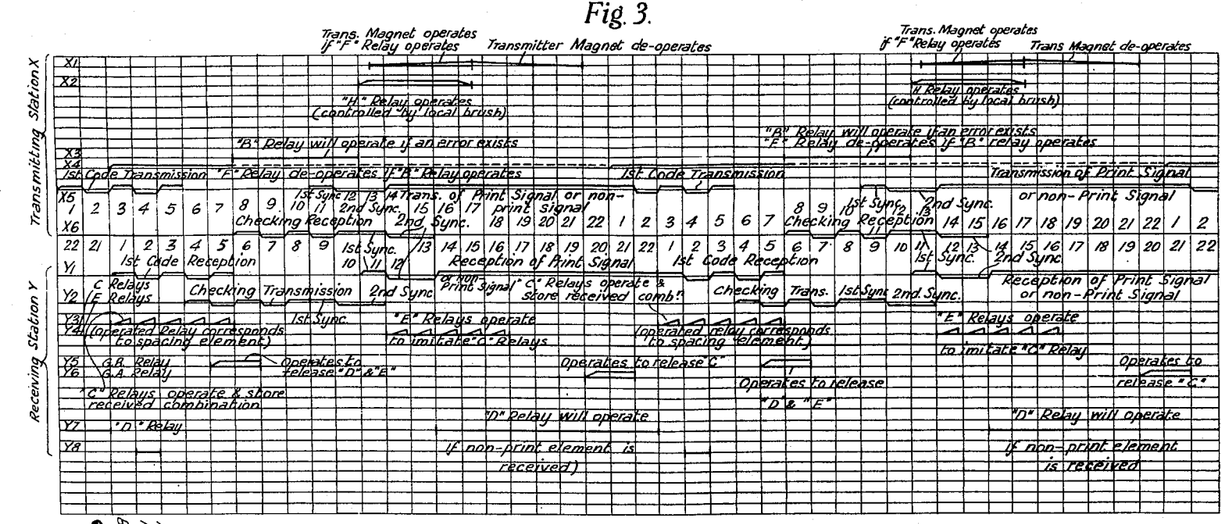
Fig. 3 is a timing diagram of the arrangements of Figs. 2A and 2B.

In order to make still clearer the sequence of operations in accordance with Figs. 2A and 2B attention is directed to the timing diagram of Fig. 3, which shows the timing of different operations during two complete rotations of transmitting and receiving distributors at both stations.

The different vertical columns numbered 1 ... 22, 1 ... 22 represent the times when the brushes of the distributors pass over the segments of the distributors so numbered. The different horizontal lines to which reference characters X1 ... X6 are appended represent events at the transmitting station X, the horizontal lines to which reference characters Y1 ... Y8 are appended represent corresponding events at the receiving station Y.

Line X5 represents the operations of the transmitting relay at station X. During time intervals 1 ... 5, the signal element impulses are transmitted. These are received after a delay due to the propagation time of the signals, here represented as two signal element periods on segments 1 ... 5 of the receiving distributor at station Y as shown in line Y1. As shown in line Y3, the relays CA ... CE operate in accordance with the received signal impulses and close locking circuits for themselves.

Since a difference of two segments is assumed between transmitting and receiving distributors, the brush of transmitting distributor at station Y is traversing segment 6 as the brush of the receiving distributor is traversing segment 4 and, as shown in line Y2, the transmission back of the received signal then commences, without waiting for all the signal elements to have been received. This is received at station X two signal element periods later, as shown in line X6. The transmission from station Y occupies segments 4 . . . 8 of the transmitting distributor and is received, see line X6, over segments 8 . . . 12 of the receiving distributor at station X. As shown in line X3 the relay B operates during this period if an error exists.

As shown in line X4, the relay F operated during the passage of segment 1 of the receiving distributor and during the passage of segments 8 . . . 12 of this distributor relay F is de-energised if relay B has operated.

Line X5 shows the transmission of a printing or non-printing signal during the passage of segments 14 to 22 of the transmitting distributor. Line X2 shows that relay H operates commencing on segment 13 of the transmitting distributor and immediately after the operation of relay H the magnet controlling the tape transmitter operates, if the relay F is operated and remains operated until the middle of segment 17 when relay H and this magnet are both de-energised. The transmission of a code combination (the same as before or another one, according to whether the tape transmitter has not been stepped or has been stepped) follows immediately upon the print or non-print signal.

In the meantime as shown in line Y4 the relays EA . . . EE are operated over segments 12 to 16 of the receiving distributor their operation overlapping the commencement of the reception of the printing or non-printing signal which commences on segment 14 of the receiving distributor and extends to segment 1 as shown in line Y1. As shown in line Y7 the conditions for operation of relay D on a non-print signal extend over the same period of time as the reception of a print or non-print signal. Overlapping this period as shown on line Y6, the relay GA operates over segments 20 . . . 21 to release the relays CA . . . CE which are then ready to receive a new signal combination over segments 1 . . . 5 of the receiving distributor line Y3, and the same process as described above takes place. On segment 2 of the receiving distributor, as shown in line Y8, the printer is operated, if a print signal had been received and thus the signal combination received during one revolution of the distributor is printed during the next revolution of the distributor. As shown in line Y5, the relay GB operates during the passage of segments 5 and 6 of the receiving distributor and releases relay D, if operated, and the relays EA . . . EE.

The arrangement by which the received code combination as received by the relays CA . . . CE is transferred to the relays EA . . . EE has the advantage of saving time, as it enables the relays CA . . . CE to be used again for the reception of a new code combination without waiting for the end of the signal which determines whether the letter is to be printed or not printed.

It will be noted that the printing signal is a long one occupying the time of passage of nine segments of the distributor. This minimises the possibility of a disturbance converting a non-print signal into a print signal. As stated above, the print signal consists of a plurality of elements all of the same character and also of that character possessed by possible disturbance. Suppose for example that fading is present and that fading or absence of carrier current corresponds to the print signal, then mutilation of the code elements of a signal combination will take place and a non-print signal which consists of a long period of emission of carrier current will be sent. During the period of this signal relay D at station Y is connected to contacts of the receiving relay RRA. Fading may cause some of the elements of carrier emission to be received as absence of carrier but it is only necessary for a cessation of fading to take place for the period of half a segment for relay D to be operated. Once operated it closes a locking circuit and keeps the printer magnet circuit open.

What is claimed is:

1. In a printing telegraph system employing transmission and retransmission of signals, a printing telegraph transmitter system comprising means for transmitting a signal combination, means for receiving said retransmitted signals, means for automatically comparing said received signals with the transmitted signal combination and means operative in response to the signal comparison for sending a print signal followed by a second signal combination or a non-print signal followed by a retransmission of the first mentioned signal combination according as the two signal combinations compared are the same or different.

2. Printing telegraph system comprising means at a first station for transmitting a signal combination, means at a second station for receiving said signal combination and for retransmitting it to the first station as received, means at the first station for automatically comparing the last mentioned signal combination as received with the first mentioned signal combination as transmitted and for transmitting in response to said comparison a printing or non-printing signal according to whether the two are the same or different and for retransmitting the first mentioned signal combination if the two are different, and means at the second station for printing a character corresponding to the signal combination only upon receipt of a printing signal.

3. Printing telegraph system as claimed in claim 2, wherein means is provided for converting distortion impulses caused by fading and interference into one kind only of disturbance impulses, said printing signal consisting of a plurality of elements all producing a response similar to that produced by the disturbance impulse at the receiving station.

4. Printing telegraph system as claimed in claim 2, wherein said transmitting station comprises a source of voltage and a transmitter comprising bus-bars and contacts thereon and said comparing means comprises two relays each connected between said source and one of the bus-bars of the telegraph transmitter, means for connecting potentials of the retransmitted and received signal combination to the contacts of said transmitter, so that if said combination is different from that represented by said contacts one of said relays operates a third relay, and contacts on said two relays for interrupting the circuit of said third relay which when operated determines the sending of a printing signal and when unoperated the sending of a non-printing signal.

5. Printing telegraph system as claimed in claim 2, in which rotating distributors are employed synchronised by the transmission of a correcting signal separate from the signal combination and in which the said correcting signal is of opposite character to the printing signal.

6. Printing telegraph system as claimed in claim 2 in which the signal combination is received upon a set of relays and is thereafter transferred to a second set of relays the first set of relays being released for reception of a second signal combination whilst the character corresponding to the first signal combination is being printed.

7. Printing telegraph system as claimed in claim 2 in which the retransmission of a received combination to the first station commences before the complete combination has been received.

8. Printing telegraph system as claimed in claim 2 in which a relay responsive only to a non-printing signal is connected to the receiving means and is adapted to close a locking circuit for itself and prevent printing taking place.

ALFRED EDWARD THOMPSON.
REGINALD DENNIS SALMON.